United States Patent Office 3,554,927
Patented Jan. 12, 1971

3,554,927
CATALYST FOR MANUFACTURE OF METHACRYLALDEHYDE
Roger P. Cahoy, Merriam, and Donald M. Coyne, Prairie Village, Kans., assignors to Gulf Research & Development Company, Pittsburgh, Pa., a corporation of Delaware
No Drawing. Original application Feb. 17, 1966, Ser. No. 528,050, now Patent No. 3,439,045, dated Apr. 15, 1969. Divided and this application Sept. 13, 1968, Ser. No. 798,478
The portion of the term of the patent subsequent to May 27, 1986, has been disclaimed
Int. Cl. B01j 11/82
U.S. Cl. 252—437  2 Claims

ABSTRACT OF THE DISCLOSURE

Catalysts which are useful for vapor phase oxidation of isobutylene, consisting of intimately mixed oxides of copper, molybdenum and tellurium on a refractory solid support are made, for example, by coating a solid such as silicon carbide with an aqueous solution of copper, molybdenum and tellurium compounds and heating the coated solid to at least 350° C.

DESCRIPTION OF THE INVENTION

This application is a division of U.S. Ser. No. 528,050, filed Feb. 17, 1966, now U.S. Pat. 3,439,045, which in turn is a continuation-in-part of U.S. patent application Ser. No. 208,637, filed July 9, 1962, now abandoned and U.S. Ser. No. 247,267 now abandoned, Ser. No. 247,268, now abandoned and Ser. No. 247,307, now abandoned, the latter three applications having been filed on Dec. 26, 1962.

The present invention is directed to the oxidation of 2-methylpropene (isobutylene) to methacrylaldehyde (methacrolein) with maximum selectivity and catalyst life, with minimum expense for catalyst replacement and without the necessity of using purified isobutylene as raw material.

In U.S. Ser. No. 208,637 the applicants disclosed the oxidation of isobutylene by contacting a gaseous feed stream consisting of isobutylene, air and steam with a novel metal oxide catalyst complex, for example, a composition having the empirical formula $Cu_9Te_{0.9}PMo_{12}O_{49.3}$ supported on lumps of cemented silicon carbide aggregate. The use of a catalyst composition having the empirical formula $Cu_9Te_{0.9}Mo_{12}O_{46.8}$ is also specifically exemplified in the application to demonstrate the effectiveness of simple compositions based only on the metal oxides which are essential for production of the catalyst for isobutylene oxidation. In the prior application the conversion of isobutylene at rates in excess of 40 percent with a corresponding yield (selectivity) in excess of 75 percent are exemplified, specifically, to illustrate the type of results which are obtained by the disclosed process.

Briefly, our process for converting isobutylene to methacrolein may be described as comprising reacting isobutylene at a temperature within the range of about 350° to 525° C. in the presence of oxygen and a metal oxide composition produced by heating an intimate mixture consisting essentially of oxides of copper, molybdenum and tellurium to a temperature at least as high as that employed in converting isobutylene to methacrolein, said oxides being present in a ratio of about 1 to 20 moles of copper oxide and at least 0.01 mole of tellurium oxide per 12 moles of molybdenum oxide, said metal oxide composition being on the surface of a refractory solid which is essentially non-reactive with respect to the metal oxide composition and possesses a surface area of less than about 10 sq. meters per gram.

So that the process may be better understood, there is presented below a detailed discussion with illustrative examples.

(A) THE CATALYST

Before operating the process, it is necessary to obtain a quantity of the catalyst, which is of an unusual type, possessing some unique characteristics. The selection of the particular metal oxide composition for the purpose is based on its ability to convert isobutylene to methacrolein with selectivities as high as 70 to 75 percent, even when conversion rates are maintained above about 65 percent by regulation of temperature and oxygen concentration. The preferred metal oxide compositions are capable of extraordinarily high yields of methacrolein per pound of active catalyst. Consequently, small differences in the price of the catalyst raw materials have no great economic significance, unless they directly affect the useful life or the overall activity of the catalyst. The selection of raw materials for catalyst manufacture is therefore based mainly on these factors, as well as convenience.

(1) Catalyst carrier or support

The catalyst support is selected for durability and enhancement of catalyst activity and life. Silicon carbide aggregate consisting of crystals of silicon carbide cemented together to form porous masses has been found to possess the best combination of properties. However, other refractory solids which are non-reactive with respect to the metal oxide composition such as, for example, alumina and zirconium silicate can be employed, providing they have a surface area of less than about 10 sq. meters per gram and preferably less than 5 sq. meters per gram. The size and shape of particles of catalyst support are selected so as to minimize packing, clogging and formation of large cavities in the catalyst bed.

(2) Catalyst composition

The catalyst composition which is coated on the support is of the metal oxide type, consisting of a complex system resulting from interaction of oxides of copper, molybdenum and tellurium. A suitable composition can be prepared, for example, by forming an intimate mixture of these oxides in the proportions indicated below, followed by interaction at elevated temperature:

| | Moles |
|---|---|
| CuO | 1–20 |
| $TeO_2$ | 0.01–10 |
| $MoO_3$ | 12 |

The empirical formula of the catalyst may vary over rather broad limits, as indicated by the above ranges of proportions. Although the composition of the catalytically active sites in such a composition may have a specific empirical formula, this would be difficult to prove. Efforts to discover the range of empirical formula of a catalyst possessing optimum activity and selectivity have established preferred limits of composition of a specific interaction product as indicated below:

$$Cu_{9\pm1}Te_{1.5\pm0.2}P_{1.1\pm0.1}Mo_{12}O_{approx.\ 50}$$

The oxygen content of the composition exhibits some variability and is difficult to determine accurately. Since metal oxides in general are non-stoichiometric compositions, some variability in the oxygen analysis is not unusual. An intimate mixture of metal oxides may conceivably be made by grinding or mulling followed by heating. However, the preferred method of manufacture is to prepare an aqueous solution of water-soluble compounds of copper, tellurium and molybdenum, coat the solution on a carrier, evaporate the water and then heat the dried solid material. In the preferred method of catalyst manufacture, differential thermal analysis indicates that at least one reaction occurs at temperatures substantially lower than the temperatures at which the isobutylene oxidation process is customarily operated. For instance, in manufacturing the composition set forth above by empirical formula, the dried coating of soluble salts appears to undergo reactions within the range of about 115° to 175° C. to yield a product of apparently stable composition. For want of a better descriptive term this product is called an intimate mixture of metal oxides. Although the best performing product has a rather definite empirical formula and is obtained by means of a chemical reaction, it is very difficult to characterize. The profuseness of peaks obtained by X-ray diffraction appears to indicate an extremely complex molecular or crystalline structure (a very large number of ordered spatial arrangements of atoms). Occasionally a sample of this intimate mixture of metal oxides gives indication of undergoing another reaction at about 350° C., which is apparently irreversible during the normal useful life of the substance as a catalyst.

For the sake of convenience in producing an adherent coating of uniform composition on the catalyst support, it is preferred to employ water-soluble metal salts in homogeneous solution. Preferably, these are salts such as nitrates, phosphomolybdates, silicomolybdates, tellurates and ammonia complexes, which decompose very readily to form an intimate mixture of metal oxides. If true homogeneous solutions are not readily obtainable with materials at hand, undissolved components may be incorporated as dispersed or suspended particles with satisfactory results.

Following is a suitable procedure for preparation of the preferred type of catalyst:

A hot solution of 10.9 g. of $Cu(NO_3)_2 \cdot 3H_2O$, 1.3 g. of telluric acid and 11.7 g. of phosphomolybdic acid in 50 ml. of water is added with stirring to 328 g. of a silicon carbide aggregate having an 8 to 12 mesh size. The addition is carried on in such a manner that the evaporation of the water and nitrogen oxide evolution are very rapid. The resulting dry particles of catalyst are fired in an oven for two hours at 1000° F. The dried catalyst is obtained in a yield of 341 g. The empirical formula of the catalyst is $Cu_9Te_{1.1}PMo_{12}O_{49.7}$ (empirical formulas given determined by calculation). The effectiveness of the catalyst composition in carrying out the process is demonstrated as follows:

A portion of the catalyst (200 ml.) is placed into a 400-ml. oxidation reactor. A feed stream vapor of isobutylene is employed having the following composition by volume: isobutylene—10.3%; air—51.5%; and water—38.2%. The reaction is conducted at approximately atmospheric pressure employing a temperature of 476° C. The contact time of the gaseous feed with the catalyst bed is an average of 1.8 seconds. The product is recovered in the customary manner employing water scrubbers and is analyzed by the Orsat and GLC methods (as used herein, "GLC" means "gas liquid chromatography"). The conversion of isobutylene is 33 percent and the yield of methacrolein is 69 percent.

The following aqueous mixture is also advantageously employed in the preparation of a catalyst by the procedure exemplified above: 11.6 g. of silicomolybdic acid, 5 ml. of nitric acid, 13 g. of $Cu(NO_3)_2 \cdot 3H_2O$, 1.3 g. of telluric acid and 75 ml. of water. The mixture is added to 328 g. of a 4–6 mesh of silicon carbide aggregate having a surface area of less than about 5 meters per gram. The weight of the fired catalyst containing 4.1 percent by weight of the complex, ready for use in the oxidation process, is 342 g. Empirical formula:

$$Cu_9Te_{0.9}SiMo_{12}O_{48.8}$$

A 200-ml. portion of the catalyst is charged into the conventional oxidation reactor employed in the procedure exemplified above. The heated catalyst bed is contacted with a mixed vapor feed stream having the following composition by volume: isobutylene—16.2%; air—69.5%; and steam—14.3%. The reaction is conducted at approximately atmospheric pressure at an average temperature of 507° C. The apparent contact time is 2.5 seconds. The reaction products are analyzed by the Orsat and GLC methods. A 46 percent conversion of the fed isobutylene is obtained with a methacrolein yield of 73 percent.

Water solubility of reactants was obtained by the use of phosphomolybdic and silicomolybdic acids in the above procedures. However, solubility of reactants may be achieved conveniently by other means as shown in the equation and procedure below:

$$9Cu(NO_3)_2 \cdot 3H_2O + 1.5Te(OH)_6 + H_3PO_4 + 12MoO_3 \rightarrow Cu_9Te_{1.5}PMo_{12}O_{50.5}$$

The 13.82 g. (0.096 mole) sample of $MoO_3$ dissolved exothermally in 50 ml. $NH_4OH$ (28–30% $NH_3$). The 17.40 g. (0.072 mole) sample of copper nitrate was also dissolved in 50 ml. of $NH_4OH$. The ammonium hydroxide solutions were mixed and a clear blue solution resulted. Phosphoric acid (85 percent) (0.92 g., 0.008 mole) was added with no precipitation. Telluric acid (2.76 g., 0.012 mole) was dissolved in water and added dropwise to the well stirred ammonia solution. This latter addition caused some turbidity but precipitation was not noted over a short period of time. The solution was added to 183 g. (about 218 cc.) of 4–6 mesh "CMM Carborundum" in a heated dish. The coating and firing procedure were carried out in the usual maner. The fired catalyst had a very uniform coating of catalyst composition. The catalyst weighed 204.5 g., calculated as 10.5 percent $Cu_9Te_{1.5}PMo_{12}O_{50.5}$ on porous SiC.

A double-coated catalyst having a physical structure which is especially durable and long-lived may be made by the following procedure;

Copper nitrate trihydrate (7.25 g., 0.03 mole) and telluric acid (2.30 g., 0.01 mole) were dissolved in 45 ml. of water and added to 240 g. of 4–6 mesh "CMC Carborundum" in a "Vycor" dish. The catalyst solution was absorbed by the carrier at ambient temperature. After partial drying, the coated carrier was fired for two hours at 1000° F. The sample now weighed 244 g. and theoretically contained 1.6 percent $Cu_3TeO_6$ on CMC carrier. The initial coated catalyst was then treated with 45 ml. of an aqueous solution containing 10.87 g. (0.045 mole) copper nitrate trihydrate and 0.0005 mole equivalent soluble tellurophosphomolybdate (ratios:

$$Te/1.1P/12Mo/O_x)$$

The completed catalyst was again fired and weighed 258 g. The preparation was repeated employing "CMM Carborundum."

The catalyst prepared as described above on CMC carrier was evaluated in a conventional oxidation reactor. With a feed gas stream in the molar proportions of 1 isobutylene, 1.5 oxygen (as air) and 2.1 water, the catalyst converted 48 percent of the isobutylene at 492° C. to yield 75 percent methacrolein. Evaluation of the catalyst prepared on the CMM carrier under similar oxidation conditions indicated 57 percent isobutylene conversion with a 74 percent yield of methacrolein.

The double coated catalysts were stacked in a single tubular reactor and the layers were separated by silicon carbide. Normal oxidation conditions to include water, air and isobutylene were maintained for a period of 1000 hours. The catalysts were separated and again evaluated in an analytical oxidation reactor. The yields and conversions had not changed, substantially, over the 1000 hour period. The analyses indicated good catalyst stability on both carriers (CMM and CMC Carborundum).

If desired, catalyst life can also be prolonged by the procedure illustrated below:

Considerable tellurium is lost with time from the isobutylene oxidation catalyst. This loss of tellurium may be attributed to decomposition of the catalyst with the sublimation of tellurium oxide, since it sublimes at 450° C.; however, the exact mechanism of loss is not known. This loss of tellurium may become a serious problem, resulting in a decline of selectivity after 2000 hours or more, so that replacement of the catalyst becomes necessary.

The loss of tellurium from the oxidation catalyst may be prevented by the addition of tellurium oxide vapor to the feed of the reactor. Studies with a catalyst on a Carborundum CMM support and with tellurium oxide in the feed have shown that the catalyst loses little or no tellurium after 1000 hours. Furthermore, the activity and selectivity of the original catalyst have been maintained. This information is summarized in the table below.

TABLE I.—1,000 HOUR CATALYST LIFE STUDIES

| Composition | Carrier | Hours | Loss of activity | Percent Te loss | Te Feed |
|---|---|---|---|---|---|
| 6.6 percent $Cu_9Te_{1.5}PMo_{12}O_{50.5}$ | CMM | 1,000 | [1] | 50 | None. |
| Same | CMM | 1,000 | [1] | [1] | .077 mg. Te per hour. |

[1] Negligible.

Although a long-lived, very active and selective catalyst is probably the most economical in the long run, the following procedure is recommended for production of catalyst at the lowest initial cost per unit weight of active metal oxide composition:

The following reagents were added to a 1000 ml. flask fitted with a magnetic stirrer, heating mantle and reflux condenser: 27.64 g. (0.192 mole) of $MoO_3$, 2.00 g. (0.017 mole) of 85 percent $H_3PO_4$, 3.06 g. (0.024 mole) of powdered Te metal, 10 ml. of 30 percent $H_2O_2$ and 650 ml. of water. Solution was complete within 14 hours and 34.8 g. (0.144 mole) of copper nitrate was added. The aqueous solution was evaporated over 366 g. (436 cc.) of 4–6 mesh "CMM Carborundum" and fired at 1000° F. The catalyst weighed 410 g., calculated at 10.7 percent $Cu_9Te_{1.5}PMo_{12}O_{50.5}$ on porous SiC.

In general, simple catalyst compositions are preferred, since introduction of another reagent of any kind can bring about substantial changes in catalyst character, often detrimental. However, it has been found that inclusion of a modifying proportion of tin oxide in the composition may greatly increase the isobutylene conversion without loss of selectivity, thus alleviating a problem which arises when impure isobutylene is employed as raw material in the form of a mixture of butanes and butenes.

A solution containing 75 ml. of water, 17.4 g. (0.072 mole) of copper nitrate trihydrate, 0.008 mole equivalent of tellurophosphomolybdate ($1\frac{1}{2}Te \cdot 1.1P \cdot 12Mo \cdot O_x$) and 0.004 mole (1.00 g.) dibutyltin oxide (dissolved in dilute $HNO_3$) was added to 411 g. of 4–6 mesh "CMM Carborundum." After firing in the usual manner, the cooled catalyst weighed 433 g. The calculated stoichiometry approximated 5% $Cu_9Te_{1.5}PSn_{0.5}Mo_{12}O_{51.5}$ on CMM carrier. The catalyst indicated enhanced activity. Comparative data verifying the effects of tin are shown below. In order to obtain a valid comparison, the added tin compound was reacted with portions of a single batch of supported catalyst and comparisons were made with other portions to which no tin was added. Although some improvement is noticeable in conversion of pure isobutylene, the greatest benefit is evident in conversion of the isobutylene in the butane-butene mixture.

FEED.—PURIFIED ISOBUTYLENE
7.5% $Cu_9Te_{1.5}PMo_{12}O_{50.5}$—CMM

| | Contact time, seconds | Feed Mole Ratio $IC_4$-$O_2$-$H_2O$ | Percent Isobutylene Converted | Percent yield methacrolein |
|---|---|---|---|---|
| Temperature °C.: | | | | |
| 485 | 3.2 | 1–1.5–0.6 | 61 | 77 |
| 487 | 3.3 | 1–1.5–0.6 | 63 | 77 |

7.5% $Cu_9Te_{1.5}PMo_{12}O_{50.5}$ + 0.2% $SnO_2$—CMM

| | | | | |
|---|---|---|---|---|
| 482 | 3.4 | 1–1.8–2.2 | 77 | 72 |
| 481 | 3.4 | 1–1.8–2.2 | 78 | 72 |

FEED.—19% ISOBUTYLENE AS BUTANE-BUTENE MIXTURE
7.5% $Cu_9Te_{1.5}PMo_{12}O_{50.5}$—CMC

| | | | | |
|---|---|---|---|---|
| 498 | 2.2 | 1–1.6–1.8 | 40 | 77 |
| 491 | 2.2 | 1–1.4–1.7 | 40 | 73 |

7.5% $Cu_9Te_{1.5}PMo_{12}O_{50.5}$ + 0.3% $SnO_2$—CMM

| | | | | |
|---|---|---|---|---|
| 489 | 2.6 | 1–1.9–0.9 | 69 | 70 |
| 482 | 2.6 | 1–2.0–0.9 | 68 | 71 |

One problem associated with isobutylene oxidation is the formation of tar-like, non-volatile by-products which may deposit in the catalyst bed, on the walls of reactors and pipes or appear in the aqueous mixture obtained upon quenching the hot gases as they leave the reactor. Both isobutylene and oxygen are consumed by this side reaction. It has been disclosed in U.S. Ser. No. 247,267, U.S. Ser. No. 247,268 and U.S. Ser. No. 247,307 that up to about 95 percent of the copper in the catalyst may be replaced by chromium, cobalt or nickel to yield catalysts which may be used with substantial reduction of tar formation. These catalysts, being more complex, are somewhat more expensive to manufacture but the extra expense is justified if the cost of isobutylene feed should increase, or if isobutylene should happen to become a scarce commodity. Preferred catalyst compositions are made by reacting the metallic oxides in approximately the following proportions:

$Cu_6Cr_3TeMo_{12}$ $Cu_4Co_8TeMo_{12}$ $Cu_5Ni_3TeMo_{12}$

Following is exemplified the preparation and use of a catalyst in which a portion of the copper is replaced by chromium.

A copper - chromium - tellurium - phosphorus - molybdenum-oxygen catalyst is prepared employing a 4 to 8 mesh size silicon carbide aggregate support and the following reactants: an aqueous solution of 7.25 g. of $Cu(NO_3)_2 \cdot 3H_2O$; 11.5 g. of phosphomolybdic acid; 1.15 g. of telluric acid; 6.0 g. of $Cr(NO_3)_3 \cdot 9H_2O$; and 75 ml. of water. These reactants are combined and added to the support at elevated temperature. The addition is carried on in such a manner that the evaporation of the water of the mixture is very rapid. The resulting dry particles of catalyst are fired in an oven for two hours at 1000° F. The empirical formula of the catalyst complex provided is $Cr_3Cu_6TePMo_{12}O_{51}$. The dried supported catalyst has 6.6 percent by weight of the catalyst complex.

The following results are obtained with the provided catalyst in repeating the above oxidation procedure and the indicated conditions; (1) 488° C., 3.3 seconds contact time, and a ratio by volume (isobutylene/air/$H_2O$) of 10.2/70.6/19.2 to provide a 65 percent conversion of isobutylene and yield percentages as follows: methacrolein—74; CO—5; and $CO_2$—12 (total accountability—94); (2) 475° C., 3.5 seconds contact time, and a ratio of 10.2/70.6/19.2 to provide an isobutylene conversion of 55 percent and a methacrolein yield of 76 percent; and (3) 488° C., 3.9 seconds contact time, and a ratio of 10.0/68.3/21.7 to provide an isobutylene conversion of 61 percent and yield percentages as follows: methacrolein—75; CO—6; and $CO_2$—14 (total accountability—95).

There is exemplified below the preparation and use of a catalyst in which a portion of the copper is replaced by cobalt.

A hot mixture of 7.3 g. of $Cu(NO_3)_2 \cdot 3H_2O$, 8.7 g. of cobalt nitrate hexahydrate, 11.6 g. of phosphomolybdic acid, and 1.0 g. of telluric acid in 100 ml. of water is added with stirring to 213 g. of a porous silicon carbide aggregate having a 4 to 8 mesh size. The addition is carried on in such a manner that the evaporation of the water of the mixture is very rapid. The resulting dry particles of catalyst are fired in an oven for two hours at 1000° F. The dried catalyst is obtained in a yield of 228 g. and has about 6.6 percent by weight of the catalyst complex of the following formula: $Cu_6Co_6TePMo_{12}O_{52.5}$ (empirical formula determined by calculation).

A portion of the catalyst (200 ml.) is placed into a 300-ml. oxidation reactor. A gaseous feed stream of isobutylene is employed having the following composition by volume: isobutylene—12.4 percent; air—72.3 percent; and water—15.3 percent. The reaction is conducted at approximately atmospheric pressure employing a temperature of 495° C. The contact time of the gaseous feed with the catalyst bed is an average of 2.2 seconds. The product is recovered in the customary manner employing water scrubbers and is analyzed by the Orsat and GLC methods (as used herein, "GLC" means "gas liquid chromatography"). The conversion of isobutylene is 48 percent and yields are as follows: methacrolein—67 percent; CO—5 percent; and $CO_2$—12 percent (total accountability percentage—84 percent).

The process is repeated employing a 463° C. reaction temperature, an average contact time of 2.0 seconds, and a reaction feed having a ratio by volume (isobutylene/air/$H_2O$) of 12.3/74.1/13.6 to provide a 31 percent conversion of isobutylene and the yield percentages as follows: methacrolein—73; CO—4; and $CO_2$—10 (total accountability—84).

The modification of the catalyst by substituting nickel for a part of the copper is illustrated below.

A copper-nickel-tellurium-phosphorus-molybdenum catalyst complex is prepared employing silicon carbide aggregate support and the following reactants: 7.3 g. of $Cu(NO_3)_2 \cdot 3H_2O$, 11.5 g. of phosphomolybdic acid, 1.15 g. of telluric acid, and 3.4 g. of nickel nitrate hexahydrate in 75 ml. of $H_2O$. The reactants, in the form of a hot aqueous solution, are added with stirring to 184 g. of a porous silicon carbide aggregate having a 4 to 8 mesh size. The addition is carried on in such a manner that the evaporation of the water of the mixture is very rapid. The resulting dry particles of catalyst are fired in an oven for two hours at 1000° F. The dried supported catalyst has 6.1 percent by weight of the catalyst complex. The empirical formula of the complex: $Cu_6Ni_3TePMo_{12}O_{49.5}$.

The following results are obtained with the provided catalyst in repeating the above process at the indicated conditions: (1) 484° C., 3.5 seconds contact time, and a ratio by volume (isobutylene/air/$H_2O$) of 10.1/71.0/19.0 to provide a 56 percent conversion of isobutylene and the yield percentages as follows: methacrolein—79; CO—5; and $CO_2$—10 (total accountability—94). (2) 477° C., 3.6 seconds contact time and a ratio by volume (isobutylene/air/$H_2O$) of 10.1/71.0/19.0 to provide a 50 percent conversion of isobutylene and the yield percentages as follows: methacrolein—82; CO—5; and $CO_2$—9 (total accountability—96). (3) 500° C., 4.3 seconds contact time and a ratio by volume (isobutylene/air/$H_2O$) of 10.9/79.4/9.7 to provide a 65 percent conversion of isobutylene and the yield percentages as follows: methacrolein—77; CO—6 and $CO_2$—12 (total accountability—95).

(3) Catalyst regeneration

The procedure for catalyst regeneration is remarkable for its simplicity.

A 175 cc. (158 g.) portion of a catalyst which had been used 2100 hours and which showed low activity and selectivity was screened to remove approximately 10 percent of the active catalyst component present as loose, non-adherent powder. The spent catalyst was then treated with a solution of catalyst reagents in the same manner as fresh uncoated catalyst support and fired. The new coating was equivalent to 5.7 percent $Cu_9Te_{1.5}PMo_{12}O_{50.5}$ on Carborundum CMC. Testing of a 150 cc. charge of the recoated catalyst in a reactor indicated the catalyst to be essentially identical to the original fresh catalyst.

(4) Construction of catalyst bed

The catalyst bed is preferably stationary and so positioned that reactants flow downward vertically through the bed. Free space in the reactant entry zone is to be avoided, because of the possible occurrence of non-catalytic gas phase oxidation. Voids in the reactor are preferably packed with particles of inert refractory material so as to discourage free space reactions.

(B) REACTION CONDITIONS

(1) Reactant ratios

The hydrocarbon feed stream may contain from about 8 percent isobutylene to substantially pure isobutylene in operation of the process.

The complete reactor feed consists preferably of preheated hydrocarbon, steam and air, which are introduced into the reaction with prior mixing. It is recommended that approximately the following molar ratios of reactants be maintained in the feed streams: 1 mole isobutylene/ 1.5 moles $O_2$/1 to 15 moles $H_2O$, preferably about 1.5 moles. The presence of steam prevents erratic behavior of the system. The concentrations of both isobutylene and oxygen in the gaseous stream through the reactor diminish as the reaction proceeds, resulting in a decrease in reaction rate. It may be desirable to take steps to compensate for this effect so as to obtain the best possible conversion. Otherwise, unreacted isobutylene may be recovered and recycled.

(2) Temperature

Although the operable temperature range is very broad, for economical operation it is recommended that the temperature be kept within the range of about 350 to 525° C. Preferably, the temperature is only permitted to vary between about 430° and 480° C., with the control point set at about 440° C. With adequate provision for heat exchange, continuous cooling will be employed during operation and fluctuation of temperature will be infrequent. Erratic and violent temperature fluctuations are not characteristic of the process and may be taken as an indication of failure to maintain the steam feed ratio, or perhaps of excessive feeding of oxygen to the system.

(3) Pressure

Preferred pressure is one atmosphere plus sufficient additional pressure to overcome the resistance of the porous catalyst bed to gas flow. The catalyst bed should offer as little resistance to gas flow as is practically feasible, so as to create the minimum pressure differential in the system.

(4) Throughput rate

Throughput rate may vary greatly, one volume of feed gas per volume of catalyst bed every 1 to 15 seconds being reasonable. A preferred range is one volume of feed gas per volume of catalyst bed every 2.5 to 3 seconds. At high linear velocities of gas flow through the catalyst bed, better rates of production of methacrolein per hour per volume of catalyst bed can be obtained but the contact time is short and control of this condition becomes more critical. Since the obtaining of the higher production rate is accompanied by this need for more accurate control, some may choose to operate at lower throughput rates, where there are fewer control problems.

(C) RECOVERY OF PRODUCT

The product may be recovered by conventional means, that is, a water quench of the hot gases, followed by scrubbing, distillation and other steps, including recovery of unreacted isobutylene and other hydrocarbons. Unreacted propylene, if present, should be removed and not recycled, since propylene is oxidized only to a negligible extent in the process and will accumulate in the recycle stream if not eliminated.

The oxidation of isobutylene without substantial effect on propylene, if present, is clear evidence of the specific nature of the combination of catalyst and reaction conditions in the process as disclosed.

What is claimed is:

1. A method of manufacturing a supported catalyst composition consisting essentially of an intimate mixture of oxides of copper, molybdenum and tellurium comprising: coating an aqueous solution of water-soluble compounds of copper, tellurium and molybdenum as phosphomolybdate or silicomolybdate on a refractory solid which is essentially non-reactive with respect to the metal oxide composition and possesses a surface area of less than about 10 square meters per gram, evaporating water, decomposing the dry water-soluble compounds by heating to yield a coating on the refractory solid of an intimate mixture of oxides in which there are present about 1 to 20 moles of copper oxide and from 0.01 to 10 moles of tellurium oxide per 12 moles of molybdenum oxide and heating the intimate mixture of metal oxides so obtained to at least 350° C.

2. A supported metal oxide catalyst composition produced by the method of claim 1 in which the refractory solid is silicon carbide.

References Cited

UNITED STATES PATENTS

| | | | |
|---|---|---|---|
| 3,192,259 | 6/1965 | Fetterly et al. | 252—437X |
| 3,243,385 | 3/1966 | Sennewald et al. | 252—437 |
| 3,401,197 | 9/1968 | Eden | 260—604X |
| 3,417,128 | 12/1968 | Eden | 252—437X |
| 3,429,930 | 2/1969 | Heslan | 252—437X |
| 3,440,180 | 4/1969 | Kiff et al. | 252—439 |
| 3,446,753 | 5/1969 | Cahoy et al. | 252—439X |
| 3,493,608 | 2/1970 | Eden | 252—437X |

PATRICK P. GARVIN, Primary Examiner

U.S. Cl. X.R.

252—439